United States Patent [19]

Eissfeldt et al.

[11] 3,838,618
[45] Oct. 1, 1974

[54] METHOD AND APPARATUS FOR CONTROLLING A CUTTING TOOL FOR CUTTING GARMENT COMPONENTS FROM FLAT FABRIC

[75] Inventors: Wilhelm Eissfeldt, Munich; Bruno Bystron, Ingolstadt; W. Gerhard Hoeber, Ingolstadt-Oberhaunstadt, all of Germany

[73] Assignee: Schubert & Salzer Maschinenfabrik Aktiengesellschaft, Ingolstadt, Germany

[22] Filed: Oct. 23, 1973

[21] Appl. No.: 408,558

[30] Foreign Application Priority Data
Nov. 2, 1972 Germany............................ 2253573

[52] U.S. Cl............................ 83/34, 83/49, 83/365, 83/368, 83/513, 83/925 CC
[51] Int. Cl............................ D06h 7/00, D06h 7/24
[58] Field of Search .......... 83/49, 56, 71, 365, 368, 83/428, 747, 925 CC, 513, 519, 34

[56] References Cited
UNITED STATES PATENTS
3,245,295  4/1966  Mueller....................... 83/925 CC X
3,304,820  2/1967  Mueller....................... 83/925 CC X Primary Examiner—J. M. Meister
Attorney, Agent, or Firm—Robert W. Beach

[57] ABSTRACT

A marker for signalling cutting line sensing means is placed on a pattern piece a predetermined distance ahead of a salient corner or a notch. In response to such signal, an alternate cutting tool program control circuit is actuated to substitute for the normal control circuit to effect preprogrammed movement of the cutting tool to cut such corner or notch and then to traverse the tool forwardly until the sensing device has been reoriented to again take over cutting tool control.

15 Claims, 4 Drawing Figures

METHOD AND APPARATUS FOR CONTROLLING A CUTTING TOOL FOR CUTTING GARMENT COMPONENTS FROM FLAT FABRIC

The present invention relates to a method and apparatus for controlling a cutting tool for cutting garment components from flat fabric in accordance with a pattern layout, the cutting line of which is traced by a sening device to actuate controls for movement of the cutting tool relative to the fabric.

During the tracing of individual pattern pieces in a pattern layout, the principal problem heretofore has been the inability of the sensing device to choose which cutting line path to follow if the edges of pattern pieces were adjoined, resulting in intersecting cutting lines. It has been necessary, therefore, to space adjacent pattern pieces and to cut a bridging strip of fabric between such pattern pieces in order to form an endless cutting line in the pattern layout while avoiding the occurrence of any crossing lines, as disclosed in DT–PS 1,256,173. The bridging strips then has to be removed from the garment components by a manual cutting operation, which materially reduced production efficiency when a large number of material layers were cut automatically from a pattern layout at one time. Only a small number of such material layers could be hand cut at once, requiring an inordinate amount of time.

Additionally, manual cutting was required to provide marginal notches, which are necessary guides in correctly superimposing cooperating margins of garment components for sewing. If such notches are incorrectly located during such manual cutting, garment components are likely to be sewn together incorrectly, requiring subsequent separation and resewing. Often the result is a damaged component which must be scrapped.

Conventional sensing devices, such as shown in DT–OS 1,460,140, and DT–OS 1,804,550, are known, which guide a cutting tool to turn in one rotative direction to cut salient corners of a pattern piece and to turn in the opposite direction to cut reentrant corners. The cutting line sensor leads the turning axis of the sensing device and the cutting tool turning axis by a distance sufficient to transmit a correct turning signal. If pattern pieces are placed too close together in the pattern layout, at a salient corner the sensor will traverse the open space between the adjacent pattern pieces and sense the next adjacent pattern piece, thus transmitting an erroneous signal and preventing cutting of the corner. Consequently, considerable fabric waste has been required in order to space adjacent pattern pieces apart sufficiently to avoid such cutting errors.

A method of laying out pattern pieces has been proposed, whereby a pattern piece is adjoined with an adjacent pattern piece or a connector at the apexes of the respective salient angles to form crossing substantially continuous cutting lines defined by aligned sides of the adjoined salient angles. While such method solved the problem of eliminating the bridging strips, the space between adjacent pattern pieces still had to be great enough to permit the sensor overtravel beyond the cutting line. Also, there were no means for selectively ignoring crossing cutting lines to permit turning about one of the adjoining salient angles. The present application discloses a method and apparatus for overcoming these remaining difficulties.

It is the principal object of the present invention to provide a new cutting tool control method and apparatus for controlling the cutting tool independently of the sensing device corresponding to critical locations on the pattern layout.

Such method and apparatus have many applications, including use with pattern layouts where pattern pieces are laid out quite close together, where salient corners of adjacent pattern pieces are adjoined but are not to be followed as intersecting crossing cutting lines, where a marginal notch is to be cut, or where a salient corner on a pattern piece is approached by the cutting tool from a side requiring that the rotation for negotiating such corner be in a direction opposite the normal direction for cutting salient corners.

The foregoing object is accomplished in accordance with the present invention by providing a guide signal at predetermined locations on the cutting lines of individual pattern pieces in the pattern layout. Such guide signal interrupts control of the cutting tool by the sensing device and causes the cutting deviOe to be braked to a stop at the end of a definite distance, turned through a desired angle in a selected direction and traversed forwardly along an established short stretch of the cutting line, whereupon the sensing device is again activated. This procedure makes it possible to arrange individual pattern components of the pattern layout quite close together. For this purpose, the guide signal is interrupted at the location on the pattern layout corresponding to the location of the cutting tool when such cutting tool is located ahead of a point about which it is to turn a distance equal to the cutting tool braking distance. Such turning point may be a salient corner in the endless cutting line of the pattern layout, or it may be the location of a marginal notch. Such a guide signal may also be provided to effect cutting tool braking ahead of the joining point of the adjoining salient angles of two pattern components to permit turning about that point to change direction rather than to follow a continuous cutting line crossing the joining point.

Apparatus for executing this procedure in accordance with the present invention includes a marker for placement in the pattern layout which produces the guide signal, two alternatively operable cutting tool control devices and a switching device activated by the guide signal to effect deactivation of one control device and activation of another control device. By the use of such markers, which can be located at any desired position along the cutting line of an individual pattern component, control of the cutting tool by the sensing device can be switched off and a control for directing the cutting tool through a prescribed program can be substituted.

While the apparatus of the present invention can be constructed in various ways, a pattern component and the pattern layout background must have contrasting characteristics in order to define sharply the cutting lines to be sensed. For example, if one is light-reflective, the other is lightabsorptive, or magnetic and non-magnetic, or electriclly conductive and insulative, or transparent and opaque. It is especially advantageous to use a photoelectric sensing device where the pattern components are of one color and the pattern layout background is a sharply contrasting color. In this case, the marker can be of an intermediate color, or it can be a strip of the same color as the pattern components located intermediately of side portions of the same color as the background.

The markers of the present invention can be used for various purposes and, accordingly, may be located at various locations within the pattern layout. If a marginal notch is to be cut as a guide to later assembly of the garment components for sewing, a marker is located along the cutting line preceding the notch location relative to the path of travel of the cutting tool a distance proportionate to the braking distance of the cutting tool. In another application, for avoiding cutting errors through undesired skipping of the sensing device from one pattern component to another, a marker is placed to precede a salient corner or discontinuity in the cutting line in a position to assure that the cutting tool will stop at the apex of the discontinuity and will be controlled by the preprogrammed control device for turning to follow the cutting line. Similarly, if two pattern pieces are joined at least at the apex of a salient angle of one pattern piece, placement of a marker ahead of the junction will permit control of the direction the cutting tool takes at the junction. A further application is to permit the sensing device to trace the pattern piece in a direction opposite the normal direction of sensing, whereby the cutting tool is guided automatically around an unadjoined salient angle. By use of a marker of the present invention, the preprogrammed control will be switched on to effect a turning direction different from the normal turning direction which would be effected if the sensing device control were operative.

Markers can be combined to connect adjacent pattern pieces at any location along the respective adjacent continuous cutting line of each pattern piece by forming a single cutting path across which the cutting tool can travel from a first pattern piece to a second pattern piece. Subsequently, the cutting tool can return to the first pattern piece across the same path to eliminate bridging strips between the correspondingly cut garment components.

It is desirable to have the markers preformed independently of pattern pieces for a particular pattern layout, so that the markers can be located at any desired locations of a layout. Such markers include a strip alignable with a cutting line segment and having the same color or sensing characteristics as the pattern components and a guide signal portion having the sensing characteristics or color of the pattern layout background. A modified marker is especially adapted to produce marginal notches when the sensing device is travelling in a direction opposite its normal direction in order to effect the correct direction of rotation to resume tracing of the cutting line after the notch is cut. Such marker includes a strip alongside the cutting line having the pattern component sensing characteristics, which strip is narrower than the interval between the pivot and the sensor of the sensing device, and a portion overlying the pattern piece which has the sensing characteristics of the background. The latter portion has an extent greater than the sensing area alignable with the sensor during a notch-cutting operation.

As used herein, the term pattern layout includes the arrangement of pattern components on a background to cooperate with the sensing means regardless of whether the pattern layout constitutes the original components actually manipulated to form the arrangement or a reproduction thereof, such as a diapositive or any other form capable of being sensed to manipulate a cutting tool. Pattern components may be pattern pieces which correspond to garment components, or a combination of pattern pieces, connecting elements and any other devices included in the layout and having a portion representing a cutting line segment to be traced or followed by sensing means. A continuous line is a line of any length which does not include an angular discontinuity. Cutting line means any line in the layout which is to be translated to effect guidance of a cutting tool for cutting fabric along the same contours, whether according to the same or a different scale.

The pattern layout includes a background 1 on which pattern components are arranged to define an effectively endless cutting line. Individual pattern pieces may have a beginning or ending coded margin, such as disclosed in DT–OS 1,560,125, so that individual garment components are cut independently of each other, or the pattern pieces may be joined by connecting pieces in a manner whereby adjoining pieces are connected at the apexes of salient corners and the sides of the corners cooperate to form crossing, continuous cutting lines. For simplicity, only one of these possibilities will be shown in detail as the exemplary representation of the present invention, namely, the use of connecting pieces.

Figure 1:
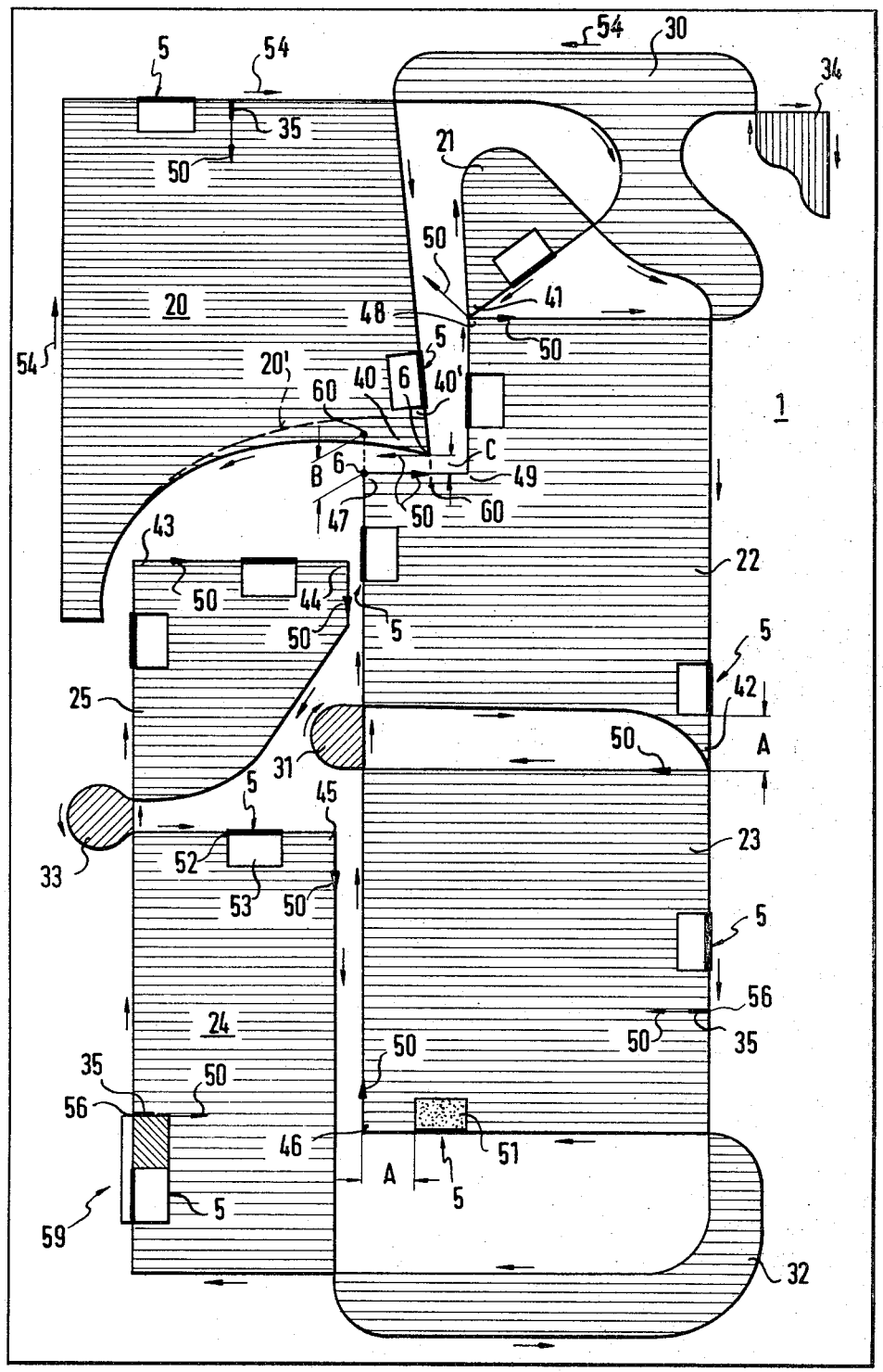
FIG. 1 is a plan of a pattern layout according to the present invention.

The pattern layout shown in FIG. 1 includes pattern pieces 20, 21, 22, 23, 24 and 25, connecting pieces 30, 31, 32 and 33 and a stop-start member 34. The connecting pieces are supplied to connect the pattern pieces in an array whereby each of the pattern pieces is traced in the same circumferential direction as every other pattern piece, so that the sensing device can negotiate all of the salient corners of the pattern pieces by rotating in one direction and can negotiate all of the reentrant corners by rotation in the opposite direction. For purposes of this illustration, it is assumed that the pattern pieces are traced in a clockwise direction. All connections between adjoining pattern pieces are formed by joining salient corners so that their apexes abut and their sides cooperate to form crossing continuous cutting lines. Two exceptions to this arrangement will be described in detail below, which exceptions are made possible only by use of markers of the present invention. The pattern components are laid out to form an endless cutting line beginning and terminating at the start-stop member 34.

A brief recitation of the functioning of a conventional photoelectric sensing device usable with the present invention will help to clarify the following description. If the sensing device is programmed to trace the cutting lines of individual pattern pieces in a clockwise direction, a sensor is spaced ahead in the direction of travel of a sensing device pivot by an interval B. The sensor traces the cutting line and emits a regular series of intermittent signals to a cutting tool control device, during which time the cutting tool is guided for translational movement to cut through a fabric layup along a corresponding line. If it is assumed that the background is white, or light-reflective, and that the pattern components are black, or light-absorptive, the sensor is alternately illuminated and unilluminated during travel along a cutting line to produce a regular intermittent signal. When the sensor reaches a salient corner in the endless cutting line, the sensor is continuously illuminated as it moves beyond the corner apex and emits a continuous signal, which signal switches on a turning device programmed to turn the sensor and cutting tool in a clockwise direction until the sensor turns sufficiently to register with the cutting line forming the other side of the salient corner, whereupon the intermittent signal effects resumption of translational movement. At a reentrant corner, when the sensor moves beyond the angle apex it is located over the body of the pattern component so that no light is received by the sensor so that the sensor signal is interrupted completely and the turning device is switched on to effect counterclockwise rotation of the sensing device and the cutting tool.

As noted above, the sensor precedes the axis of rotation for the sensing device by a lead interval B, so that any portion of a second pattern piece must be spaced from a salient corner of an adjacent first pattern piece a distance greater than the interval B. Otherwise, the sensor would traverse the open space, or light-reflective space, and align with the dark, or light-absorptive, second pattern piece, and the cutting tool control would be erroneously actuated to turn in a direction for cutting a reentrant corner instead of a salient corner. This spatial relationship is illustrated in FIG. 1 at the salient corner 47 on the upper left margin of pattern piece 22. It can be seen that, when the sensing device pivot 6 reaches the turning location or apex of the salient corner, the sensor 60, spaced ahead of the pivot 6 by a lead interval B, is aligned with the body of pattern piece 20. The normal response would be actuation to rotate the cutting tool and sensing device counterclockwise as though a reentrant corner had been reached, instead of clockwise as required to cut the salient corner 47. This is one type of problem which the control apparatus of the present invention overcomes so that the adjacent pattern pieces can be more closely spaced to reduce the amount of waste fabric between the garment components cut in accordance with the pattern layout.

According to the present invention, a marker 5, the particular construction of which is described more fully below, effects a different type of sensing characteristic and is located at a predetermined location along the cutting line, such as preceding an approaching salient corner, which causes the sensing device 60 to emit a signal for rendering the sensing device ineffective for controlling the cutting tool and for substituting a second preprogrammed control to effect a particular operation of the cutting tool. The special program of this substitute control includes deactivating the sensing device control, braking the cutting tool to stop its translational motion at a predetermined distance beyond its location at the time the guide signal is given, rotating the cutting tool in a selected direction through a predetermined arc, traversing the cutting tool forwardly along the cutting line within a specific distance, and subsequently reactivating the sensing device to resume translational movement of the cutting tool.

Figure 4:
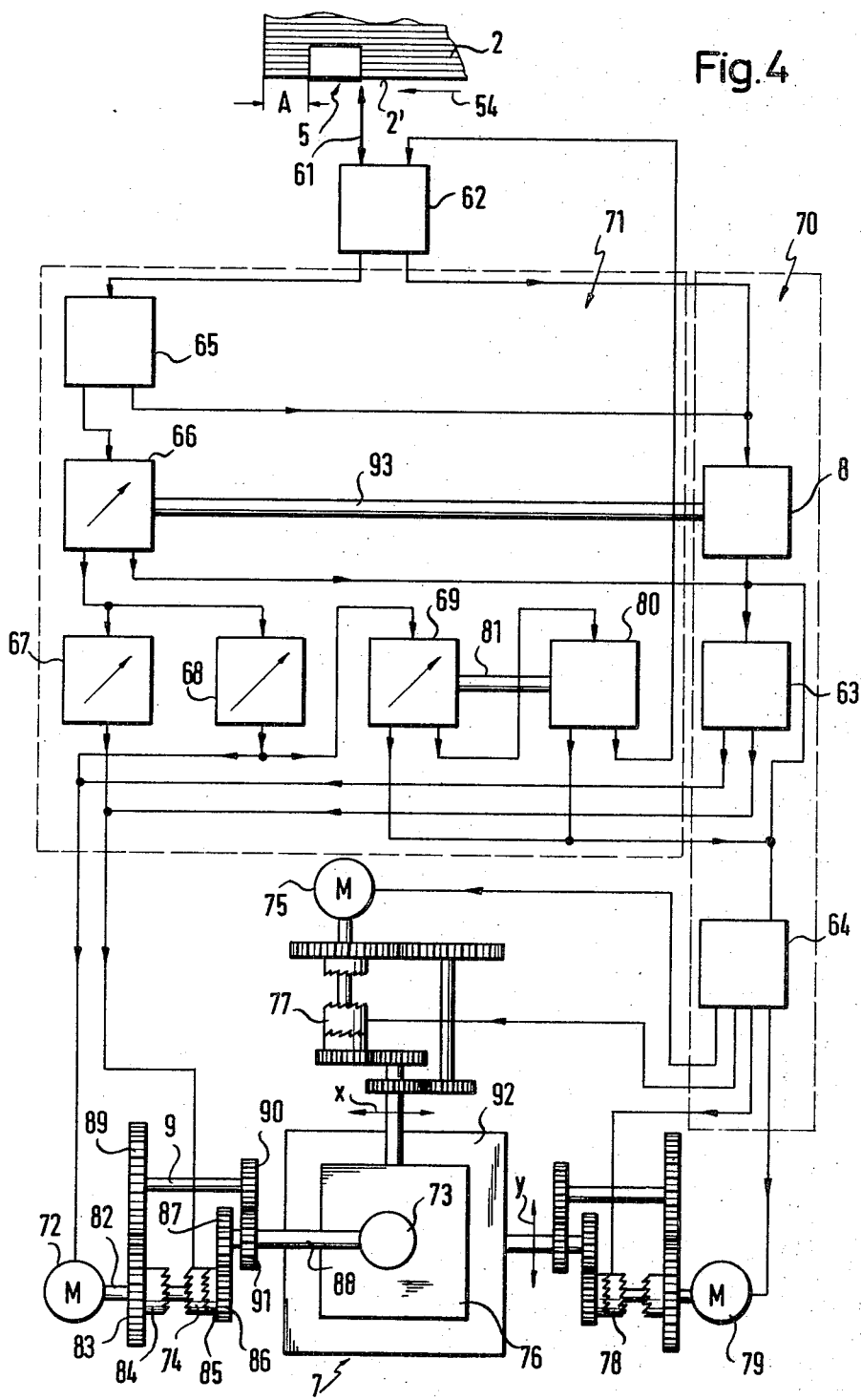
FIG. 4 is a schematic diagram of the cutting tool control means of the present invention.

The control means are shown schematically in FIG. 4 with respect to the cutting line 2' of a pattern piece 2 including a marker 5 for producing the guide signal. The sensor represented by the end of lead 61 adjacent to the cutting line traces cutting line 2' in the direction of arrow 54. The cutting device 7, shown in the lower portion of FIG. 4, and the sensing device are movable conjointly, the cutting tool being movable relative to a carrier (not shown) for a fabric stack to be cut and the sensing device being movable relative to the pattern layout. It is immaterial how the relative movements of the cutting tool and fabric carrier and of the sensing device and pattern layout are effected. The pattern layout and fabric carrier may be stationary and the sensing device 61 and cutting tool may be universally movable conjointly in their respective sensing and cutting planes. It will be assumed for the sake of simplicity that the cutting tool is movable along the X-coordinate, as indicated in FIG. 4, and the fabric carrier is movable with member 92 along the Y-coordinate, as indicated in FIG. 4, the composite movement effecting cutting of the fabric corresponding to the pattern layout cutting line.

Motor 72 drives cutting tool 73 for rotational orientation. Motor shaft 82 carries a claw clutch having a slidable collar 74, which is rotatable with the shaft and slidable along the shaft for alternative engagement with a claw member 84 carried by gear wheel 83 and with a claw member 85 carried by a gear wheel 86. Gear wheels 83 and 86 loosely encircle shaft 82 and are alternatively positively driven by selective engagement of slidable clutch collar 74 with one or the other claws on such gear wheels. Gear wheel 83 drives gear wheel 91 through gear wheel 89, shaft 9 and gear wheel 90 to rotate shaft 88, and through a bevel-gear drive (not shown), to turn cutting tool 73 in one direction. Alternatively, when clutch collar 74 engages claw member 85 on gear wheel 86, gear wheel 87 is driven to rotate shaft 88 and, consequently, cutting tool 73 in their opposite rotative directions. Similar connections are provided between motors 75 and 79 and cutting tool carrier 76 and member 92, respectively, to effect translational drive. Motor 75 and clutch collar 77 drive carrier 76 for translation in either direction along the X-coordinate. Motor 79 similarly acts through clutch collar 78 to drive member 92, which may effect translation of either the cutting tool 73 or the fabric carrier (not shown) in either direction along the Y-coordinate. Carrier 76 and member 92 can be connected with their respective drive shafts by rack-and-pinion drives (not shown).

Signals from the sensing device 61 constitute the first input to switching device 62. Such switching device has a first output connected to a sensing control device 70, generally indicated by the rectangular dash line at the right of FIG. 4, and a second output to a program control device 71, generally indicated by the rectangular dash line at the left of FIG. 4. The sensing control device 70 effects normal operation of the cutting tool in response to the sensing device 61, and the program control device 71 implements a special program. Both control devices 70 and 71 are connected to a suitable power supply (not shown).

Sensing control device 70 includes a timing unit 8, a rotational guiding system 63 and a translational guiding system 64. The output of timing unit 8 is connected with the input to both guiding systems 63 and 64. The rotational guiding system 63 has two output leads, one of which is connected to motor 72 and the other is connected to slidable clutch collar 74 of the drive between motor 72 and cutting tool 73. The translational guiding system 64 has four outputs. The first output is connected to motor 75 for moving cutting tool carrier 76 along the X-coordinate; the second output is connected to slidable clutch collar 77 between motor 75 and carrier 76; the third output is connected to the slidable clutch collar 78 between motor 79 and member 92; and the fourth output is connected to the motor 79 for effecting movement of member 92 along the Y-coordinate.

Switching device 62 connected to the sensing device 61 has an output lead connected to switch 65 of the program control device 71. Switch 65 has two outputs. The first output is connected to a first adjustable timing unit 66 and the second output is connected to the input of timing unit 8 of sensing control device 70. Since timing units 8 and 66 control the braking distance of the cutting tool, both must be identically set. To facilitate making such time-settings, timing units 8 and 66 are connected by a shaft 93, which can be turned to set or adjust the time delay interval. The unit 66 has two outputs, the first of which is connected both to a rotational guiding system 67 and to a second timing unit 68, both of which are adjustable. Rotational guiding unit 67 has an output connected to slidable clutch collar 74 to effect selection of the direction of rotation of the cutting tool, and timing unit 68 is connected to motor 72 to control the degree of rotation of the cutting tool. The output lead from timing unit 68 is also connected to a third adjustable timing unit 69.

The first adjustable timing unit 66 has a second output which is connected both to the rotational guiding system 63 and the translational guiding system 64 of the sensing control device 70. Through this connection, systems 63 and 64 are ready for use as part of the program control device 71. The third adjustable timing unit 69 has two output leads, one of which is connected to translation guiding system 64 and the other is connected to a fourth timing unit 80. Such timing unit is connected to the third timing unit 69 by a setting shaft 81 to effect corresponding adjustments of the two timing units. Timing unit 80 has two output leads, the first being connected to translational guiding system 64 and the second to switching device 62.

If a notch 35 (see FIG. 3) in the form of a straight line perpendicular to the cutting line is to be cut in the margin of a garment component, the cutting tool is rotated 90° by rotational guide system 67 and timing unit 68. Timing unit 69 then actuates translational guiding system 64 to cut the straight line, the length of which is dependent on the time set in timing unit 69. Then timing unit 80, through translational guiding system 64, effects return of the cutting tool along the notch line and subsequently actuates switching device 62 to resume cutting control by sensing device 61 and sensing control device 70.

During normal sensing of the cutting line 2', sensing device 61 emits a particular signal to switching device 62, which signal may be a continuous signal or it may be a series of intermittent signals. The switching device 62 transmits a corresponding signal to timing unit 8 of the sensing control device 70. After a preset delay corresponding to the time it takes cutting tool 73 to traverse its braking distance proportionate to cutting line interval A, the signal is transmitted to rotational guiding system 63 and translational guiding system 64. As long as the sensing device does not detect a deviation in the cutting line from a straight line, translational system 64 remains in control, and the relative movement between the cutting tool and the fabric is controlled by motors 75 and 79. If the sensing device detects a deviation, which could be a corner or simply a curve in the continuous cutting line, a corresponding command is given by timing unit 8, after the preset time delay, to rotational guiding system 63 which activates motor 72 and clutch collar 74 to turn cutting tool 73. If the deviation is a discontinuity instead of a curve so that sensing device 61 does not align with the cutting line again within a preset short time interval after the deviation is detected, the translational motion is slowed down by guiding system 64, which brakes motors 75 and 79 while rotational or turning motion continues until a cutting line is detected.

The direction in which cutting tool 73 is turned is determined by the nature of the signal emitted by the sensing device 61. For example, if the sensing device is constructed according to the disclosure of French Pat. of addition No. 93,378, and French Pat. No. 1,474,081, it can dfferentiate between four different light intensities or colors. When the sensing device aligns directly with the cutting line 2', it senses a medium light intensity. Under such conditions the turning motor 72 and clutch collar 74 are inoperative. If the cutting line curves to the right in the direction of travel, the light intensity received by the sensor 61 is increased by its increased exposure to the lighter background so that it transmits a signal to sensing control device 70 for turning the cutting tool in a clockwise direction. If the cutting line curves to the left, the light intensity decreases because the sensor is aligned with a greater portion of the light-absorptive pattern piece 2, and the sensor 61 transmits a command to the control device to turn the cutting tool in a counterclockwise direction.

In the example shown in FIG. 1, the background 1 of the pattern layout is white, and the pattern pieces 20 through 25, connecting pieces 30 through 33, and stop-start member 34 are a contrasting color, for example, black. The pattern pieces 20 through 25 are normally traced in a clockwise direction, as indicated by the arrows 54. When the sensor 60 passes the apex of a reentrant corner, such as corner 49 in the upper left portion of pattern piece 22, it will sense a completely black area, so that no signal will be transmitted to timing unit 8 by sensing device 61. Consequently, after a short preset time delay allowed for the sensing device to relocate the cutting line, the translational movement of the cutting tool 73 will be terminated by guiding system 64 and the cutting tool will be turned counterclockwise by the rotational guiding device 63, guiding device 63 having been programmed to effect counterclockwise rotation of the cutting tool 73 when no signal is transmitted by sensing device 61 to control device 70 and to effect clockwise rotation of the cutting tool 73 when a continuous signal is transmitted by the sensing device to the control device. If rotational guide device 63 receives a continuous signal caused by the sensor 60 moving beyond the end of a cutting line into complete alignment with the background, such as at salient corners 46 and 47 of the pattern pieces 22 and 23, respectively, the translational movement is stopped after a short preset time, and the cutting tool 73 is turned in the clockwise direction by rotational guiding system 63.

Figure 2:
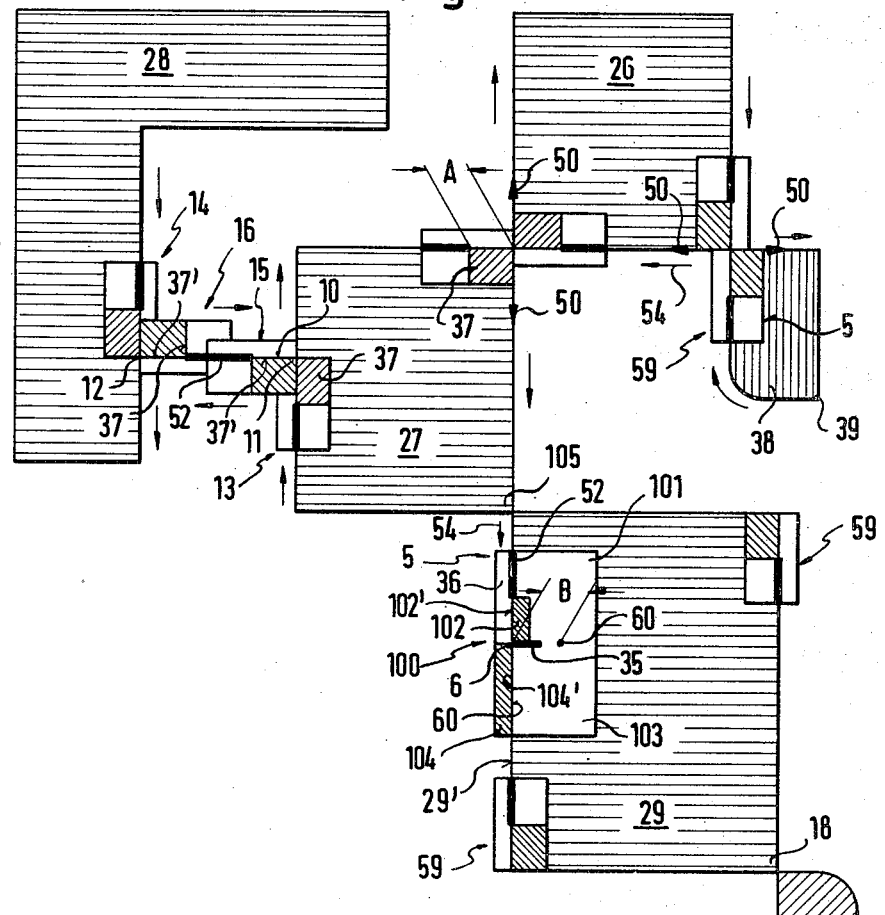
FIG. 2 is a plan of a different pattern layout according to the invention.
Figure 3:
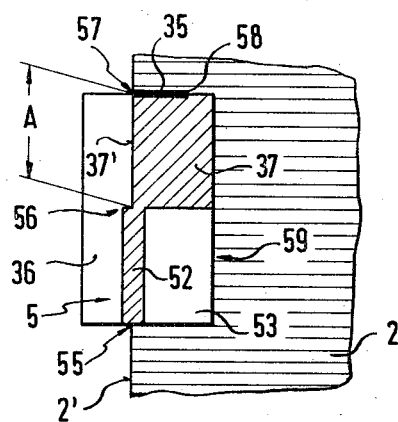
FIG. 3 is a fragmentary plan of a marker shown in FIGS. 1 and 2 on an enlarged scale.

If the fourth type of signal is given by the sensing device 61, switching device 62 is actuated to interrupt its connection with timing unit 8 of sensing control device 70 and is connected with switch 65 of the program control device 71. Markers 5 for producing the fourth type of guide signal can be constructed in a variety of ways and can be made to be sensed mechanically, electrically or magnetically, for example. However, it is preferred that the marker be sensed optically, and several forms and combinations of markers are shown in FIGS. 1 through 3. The marker 5 located on the lower margin of pattern piece 23 in FIG. 1 includes a relatively large field 51 which is of a color intermediate between the colors of the background and the pattern components such, for example, as grey. The effect is to transmit light of different intensity to the photocell sensor 60 than that transmitted when the sensor is following a cutting line defined by the boundary between a black pattern component and a white background.

The characteristic features of another marker construction are shown in FIG. 3. A marking element 59 includes a marker 5. In this case, marker 5 includes a rectangle 53 of the same color as the background, which may be a cutout in the pattern piece 2, but preferably is an overlay. The marker also includes a strip 52 having the same color as the pattern piece 2, which is aligned with a segment of cutting line 2'. Consequently, light is transmitted to the photocell sensor from both sides of strip 52, but the strip effects a dark band through the light signal, producing the effect of a different light intensity than in the three cases previously described of total light, total darkness or medium light intensity at the boundary between dark and light areas.

The marker 5 has two essential elements, namely, a strip alignable with a portion of the endless cutting line and a section having sensing characteristics the same as the pattern layout background or intermediate between the characteristics of the background and the pattern components.

When the special light intensity signal is transmitted by the sensor at the end 55 of a marker strip 52, or a grey marker 51, switching device 62 is actuated to interrupt signals to the sensing control device 70 and to transmit signals to program control device 71. If, following the end 56 of the marker 5, a normal cutting line sensing signal recurs, switch 65 is actuated to connect the first adjustable timing unit 66 with a power supply to begin the special program control of the cutting tool. Timing unit 66 is set according to the time required by the cutting tool to traverse the distance proportionate to cutting line interval A from point 56 to a point 57 corresponding to the location of a notch 35, as shown in FIG. 3, or a salient corner, such as corners 42, 46, 47 and 48 on pattern pieces 22 and 23 in FIG. 1.

Assuming that a notch 35 is to be cut in accordance with FIG. 3, at the end of the time interval for which it is set, the unit 66 actuates translational guiding system 64 to stop completely motors 75 and 79, and simultaneously actuates rotational control 67 and the second adjustable timing unit 68. Depending on the setting of rotational control 67, cutting tool 73 is rotated by gear wheels 86 and 87 in one direction or gear wheels 83, 89, 90 and 91 in the opposite direction, and such rotation continues during the time interval for which timing unit 68 is set. At the end of this interval, motor 72 is stopped, and the third adjustable timing unit 69 is actuated. Translational movement of the cutting tool is thereby initiated through guiding system 64, and motors 75 and 79. The time for which timing unit 69 is set corresponds to the time required to traverse the distance to the end 58 of the notch. At the end of such interval, timing device 80 is actuated to reverse the direction of the cutting tool to return it to the beginning point 57 of the notch. It is unnecessary to rotate the cutting tool at point 58, because no cutting is necessary during its return to the cutting line. Since the extent of cutting tool movement in both directions along notch 35 are the same, timing units 69 and 80 are set conjointly through shaft 81. When the cutting tool 73 has returned to point 57, timing unit 80 reverses switch 62 to return cutting tool control to sensing control device 70.

The pivot of sensing device 61 moves conjointly with the cutting tool in a conventional manner; and such conjoint movement continues during execution of the special program so that the sensing device sensor is located over the body of pattern piece 2 at the time it resumes control. Consequently, the sensing device emits no signal to sensing control device 70, and the first response of the sensing control device is to rotate the cutting tool in a counterclockwise direction similar to the operation described in connection with cutting a reentrant corner. Consequently, the cutting tool and sensor will be turned back to a position for continuing cutting corresponding to the cutting line 2'.

The particular nature of the operational components of the two control devices 70 and 71 is not significant. Thus, motor driven guide rollers, relays, time-delay relays, electronic blocks or other elements could be used for the components shown in FIG. 4, and additional components could be provided to perform other programs than those specifically described.

The particular program just described is effective for cutting notches, and different programs would have to be provided to execute some of the other special operations described below. A special program could be supplied to effect automatic adjustment of the adjustable timing units 66, 67, 68 and 69, to prepare them for a subsequent different operation during an interval when a normal cutting operation is being performed under control of the sensing control device 70. It is preferred, however, that components be preset and a separate program be provided for each type of operation. If the timing unit 80 is, in addition, individually adjustable, it can also be controlled independently of the timing unit 69. Thus the shaft 81 is eliminated. For example, the timing unit 80 for cutting notch markings can be adjusted exactly like the timing unit 69 by means of the program pattern; however, in cutting salient corners or in transferring from one pattern piece to the other, timing unit 80 can be adjusted to zero, so that the cutting tool does not perform the reverse movement.

In the case of separately programmed operations, the switch 65 may be connected with a stepping switch, for example, by which the program control device 71 could select a particular one of several separate programs. If separate programs were provided for cutting notches and for cutting salient angles in a direction converse to the normal salient angle cutting direction, the endless cutting line of a particular pattern layout might require a sequence of three notch-cutting operations, followed by a converse salient angle operation, followed by another notch-cutting operation. Each time program control 71 is switched on, the stepping switch would be advanced one step, and the switch 65 set to implement the correct program.

Another expedient for reducing the need for adjustments in the program control components is to provide that the distance A between the end of the marker signal at point 56 and the location 57 at which the special program is to be executed be uniform. Such a requirement also permits markers 5 to be manufactured as stock pieces, which can be inserted readily into any pattern layout. Such a marking element 59 is shown in FIG. 3, and at the lower left of FIG. 1 on pattern piece 24. In addition to the elements of marker 5 described above, namely, strip 52 having an initial end 55 and terminal end 56 and white field 53, marking element 59 has a section 37 of the same color or sensing characteristics as the pattern piece 2 and having one side 37' corresponding to the cutting line of the underlying pattern piece. The length of section 37 corresponds to the standardized braking distance A. An area 36 overlies the pattern layout background and has the same sensing characteristics or color as the background. It is preferred that elements 59 be supplied as adhesive labels, which can be easily located on a pattern display and secured in place. To locate a label 59, the end 57 of line 37' is located at the point in the cutting line where the special program is to begin, and line 37' and strip 52 are located over the segment of the pattern cutting line 2' immediately preceding the point 57. The area 53 has been shown as having the same sensing characteristics as the background, but this area need only have sensing characteristics different from the characteristics of the pattern pieces, such as the field 51 of marker 5 shown on the lower margin of pattern piece 23 in FIG. 1.

Before describing further operations which can be effected by the present invention, the cutting sequence of the layout in FIG. 1 should be described to illustrate applications of the control system described in connection with FIG. 4.

The cutting line is traced in the direction of arrows 54 starting at the lower corner of start-stop member 34, upward along its left curved side, across the intersection at the salient corner connection of member 34 and connecting piece 30, along the upper side of connecting piece 30, across the salient corner connection of connecting piece 30 and pattern piece 20, down the right side of pattern piece 20, around the salient corner 40 by special program both because it is acute and because of its close proximity to pattern piece 22, continuing around pattern piece 20, cutting notch 35 in the upper margin thereof by the special program descibed above, completing pattern piece 20 by crossing the cutting line intersection formed by the junction of the salient corners of connecting piece 30 and pattern piece 20, along the lower left curve of connector 30, along the lower right side of pattern piece 21, by special program around the acute salient corner 41, completing pattern piece 21 by crossing the cutting line intersection formed by the junction of the apexes of salient corners of connector 30 and pattern piece 21, continuing along the lower left curve of connector 30, down the right side of pattern piece 22, by special program at the corner 42 turning onto the upper side of pattern piece 23, instead of continuing along the straight line formed by the right sides of pattern pieces 22 and 23, along the upper side of pattern piece 23, around the return bend forming the left side of connector 31, along the lower side of pattern piece 22, down the right side of pattern piece 23 cutting notch 35 by special program, along the upper curve of connector 32, along the bottom and left sides of pattern piece 24 cutting notch 35 by special program, along the straight right side of connector 33, around pattern piece 25 cutting the corners 43 and 44 by special program because of their close proximity to the pattern pieces 20 and 22 beyond them, around the curved side of connector 33, along the top and right side of pattern piece 24 cutting corner 45 by special program because of its close proximity to pattern piece 23, along the lower curve of connector 32, along the bottom and left side of pattern piece 23 cutting corner 46 by special program because of its close proximity to pattern piece 24, along the right straight side of connector 31, up the left side of pattern piece 22 cutting salient corner 47 by special program because of its close proximity to pattern piece 20 and cutting reentrant corner 49 by the sensing control 70, cutting corner 48 by special program because of its close proximity to pattern piece 21, along the top of pattern piece 22, along the right curve of connector 30, and around the top and right side of start-stop member 34 to the point of beginning.

The control devices described with reference to FIG. 4 have many different possibilities of application. In each case, a guide signal is emitted from the pattern layout at a location a distance A ahead of the point where the special program must take over control of the cutting tool, which distance corresponds to the braking distance of the cutting tool. The sensing device 61 is rendered ineffective, the cutting device 7 is braked to a stop, the special program is executed, and the sensing device is reactivated to sense the cutting line. If the sensing device is located in alignment with a cutting line, translational cutting motion of the cutting tool will be resumed; if it is not located on a cutting line, the cutting tool will be turned farther in the preset direction, according to whether the sensing device receives signals from a background area, or an area having similar sensing characteristics, or whether it receives a signal from an area having pattern component sensing characteristics. Such rotation of the cutting tool will continue until the cutting line is sensed, whereupon translational movement of the cutting tool is resumed.

This procedure can be illustrated in connection with cutting of salient corners in the pattern layout of FIG. 1. A marker 5, which initiates the special program control 71, is provided ahead of each of the corners 40 through 48 of the pattern layout. Each of the corners 40 and 43 to 48 is located closer to an adjacent pattern piece than the lead interval B between the sensor 60 and pivot 6 of the sensing device 61. With particular reference to corner 40 of pattern piece 20 and corner 47 of pattern piece 22, it is clearly shown that, when pivot 6 is at the apex of the corner, sensor 60 is in alignment with the body of the adjacent pattern piece. The normal response of sensing control device 70 to such a signal would be to turn the cutting tool in the counterclockwise direction, which would turn the cutting tool in a direction opposite that required to negotiate the corner, and continue along the cutting line of pattern piece 20 in the direction of arrows 54. Consequently, whenever the distance C between a salient corner on one pattern component and the cutting line of another pattern component beyond such corner in the direction of cutting tool movement is less than the interval B, proper cutting could not be achieved because the sensor would cause the cutting tool to turn in the wrong direction. After hunting, the sensor would find the nearest cutting line to be that of the other pattern piece, would cause the cutting tool to traverse the space between the two pattern pieces and ultimately would move the cutting tool to follow the cutting line of the new pattern piece, so that the original pattern piece would be uncut. To avoid this problem previously, it was necessary to lay out pattern pieces so that they were spaced apart in the sensing direction a distance greater than interval B. For example, the dash line 20' forming a new corner 40' represents the closest cutting line contour relative to salient corner 47 of pattern piece 22 which could be correctly cut by conventional methods.

By use of a marker 5 ahead of each corner, program control device 71 would be activated; and a program would cause the cutting tool to rotate 90° upon braking at the end of distance A beyond the end of the marker to direct the cutting tool along a line 50. The cutting tool would be reciprocated along that line until the sensing control device 70 is reactivated, whereupon sensor 60, in the case of right angle salient corner 47, would cause the cutting tool to be translated along the new cutting line. In the case of acute corner 40, the sensor 60 would be in alignment with the background area, as indicated by the arrow 50 corresponding to the turning program at that corner, so that sensor 60 would cause the cutting tool to be rotated further in the clockwise direction to locate the concavely curved cutting line to be followed.

By providing the program control device of the present invention, the pattern pieces can be arranged in touching relationship, as shown between pattern pieces 21 and 22 and between pattern pieces 22 and 23. At these locations, the markers 5 are located ahead of corners 41 and 42, respectively. At corner 41, the cutting tool is turned to continue cutting along the periphery of the same pattern piece 21. At corner 42, the cutting tool is turned to transfer from pattern piece 22 onto the cutting line of pattern piece 23, whereupon the area between the adjacent ends of the two pattern pieces is cut out.

Similarly, notches 35 are cut in the manner previously described by locating a marker 5 a distance A along the cutting line ahead of each notch location, as shown in FIG. 1 at the right of pattern piece 23, on the left of pattern piece 24, and at the top of pattern piece 20.

The marking system was shown in FIGS. 1 and 3 in connection with a program control device which was set to turn the cutting tool clockwise at the end of the braking distance A. FIG. 2 illustrates a layout for cutting garment components wherein bridging strips can be eliminated when the program control device is operable in response to a guide signal from a marker to turn the cutting tool in a counterclockwise direction. In this case, marking elements 50 are used to avoid the necessity of measuring the distances A from the corners to be cut according to the present invention. In the first illustration provided by FIG. 2, the marking elements are used to initiate programmed control at the adjoining corners of adjacent pattern pieces. In this example, it will be assumed that only pattern pieces 26 and 27 are to be cut. In order that the unjoined salient angles can be cut without the aid of a special program, each of the two pattern pieces must be traced in a clockwise direction. For this purpose, four adhesive labels 59 are required to orient the sensing device and cutting tool to trace each pattern piece in the proper direction. These labels are located ahead of the adjoining salient corner connections between two pattern components.

The cutting line is traced as follows:

Starting from point 39 of stop-start element 38, along the curved side thereof, at the first marking element 59 initiating the special program to turn the cutting tool counterclockwise in the direction of arrow 50, traversing the cutting tool a short distance along such direction until the sensing control is resumed, translating the cutting tool along the bottom of pattern piece 26, by special program initiated by the marking element preceding the next salient corner turning the cutting tool counterclockwise into the direction of downwardly-directed arrow 50, traversing the cutting tool a short distance along such direction, resuming normal sensing to trace in a clockwise direction the entire periphery of pattern piece 27 (recalling that for this example pieces 29 and 28 are assumed to be nonexistent), by special program turning counterclockwise at the junction between pattern pieces 26 and 27, under normal sensing control tracing the left side, top and right side of pattern piece 26, by special program at the junction between pattern piece 26 and element 38 turning the cutting tool counterclockwise into the direction of arrow 50 along the top of element 38, and by normal sensing control returning to point 39.

In some cases, the shape or size of some pattern pieces prevent such corner-to-corner connection. For example, if the angular pattern piece 28 in FIG. 2 were adjoined with pattern piece 27 at salient corners, the result would be wastage of a large area of fabric between the two pattern pieces. To avoid such wastage, four marking elements of the type shown in FIG. 3 are combined to effect a connecting line 10 along which the cutting tool travels from pattern piece 27 to pattern piece 28 and, after tracing the latter pattern piece, returns to pattern piece 27. In this way, the two pattern pieces are cut completely, and there is no bridging strip between them because the cutting tool travels the identical path between the pattern pieces in both directions.

The connecting line 10 between the two spaced pattern pieces begins at point 11 on a continuous portion of the cutting line of pattern piece 27 and terminates at a point 12 on a continuous portion of the cutting line of pattern piece 28. Ahead of point 11, a marking label 13 is placed along the cutting line of pattern piece 27 to effect by special program rotation of the cutting tool to the left, or counterclockwise, to cut along connecting line 10. The connecting line is compositely formed by the boundary 37' of marking element 15, which boundary simulates a cutting line segment, by overlapping registration of the marker strips 52 of marking elements 15 and 16, and by cutting line simulating boundary 37' of marking element 16. After the cutting tool is rotated toward the direction of boundary 37' of element 15, the normal sensing control is effective to initiate travel of the cutting tool along line 10. When composite strip 52 is sensed, the special program control is readied; and, at the end of such strip, it is activated to cause the cutting tool to rotate to the left at point 12 onto the cutting line of pattern piece 28. Following such rotation, the normal sensing control is reactivated, and the pattern piece 28 is cut in a clockwise direction in the normal manner. As the cutting tool approaches point 12 again, marking element 14 effects activation of the special program to again rotate the cutting tool to counterclockwise toward the right to cause it to traverse line 10 again and thereby return to point 11 on pattern piece 27. Marking element 15 signals the special program control to rotate the cutting tool to the left at point 11, and thereafter the sensing device controls the cutting tool to resume cutting of pattern piece 27.

Depending on the setting of timing unit 68 of program control device 71, shown in FIG. 4, which controls the degree of rotation of the cutting tool, connecting line 10 between pattern pieces 27 and 28 can be perpendicular to the intersected cutting lines or may be disposed at an angle to the cutting lines.

As has been stated previously, it is the sequence of a special signal effected by a strip 52 of a marker 5 followed by a normal cutting line signal which effects initiation of the special program. Consequently, the distance which may be spanned by the combination of marking elements just described can be varied by varying the length of the composite strip 52 formed by marking elements 15 and 16. During the period in which the sensing device receives the modified signal from dark strip 52 and the light portions on opposite sides of the strip, the cutting tool follows a straight cutting path which continues until a normal cutting line signal resumes. The length of boundary 37' which produces a normal cutting line signal at either end of connecting line 10 corresponds to the braking distance A.

The marking label 59 shown in FIGS. 1 and 3 will effect cutting of a notch 35 when the cutting tool is travelling in the normal direction along the cutting line segment in which the notch is to be cut, such normal direction being clockwise. In FIG. 2, a marking element or label 100 is shown which enables such notches to be cut even if the notch location is approached from the opposite direction. Label 100 includes a portion forming a marker 5 having a strip 52, and a section 101 overlying pattern piece 29 having the same sensing characteristics as the background. In this instance, section 101 has a breadth greather than the lead interval B between sensor 60 and sensing device pivot 6. Section 101 could have intermediate sensing characteristics, however, like the area 51 of the marker 5 shown at the lower portion of FIG. 1. Label 100 also includes a section 36 on the side of strip 52 opposite section 101, section 36 overlying and having the same characteristics as the background. Between the terminal end of strip 52 and notch 35 is a section 102 which has the same sensing characteristics or color as the pattern component and defining a cutting line boundary 102'.

Alongside and beyond the terminal end of section 102 corresponding to the location of notch 35 is a section 103 having the sensing characteristics or color of the pattern layout background. Both the breadth of section 103 and its length on either side of notch 35 are greater than the lead interval B between pivot 6 and sensor 60. Following section 36 in the cutting direction and alongside section 103, marking element 100 includes a section 104, which overlies the background and has the sensing characteristics or color of the pattern components. Boundary 104' between sections 103 and 104 simulates a cutting line. Boundaries 102' and 104' are disposed in end-to-end alignment, and are aligned with a segment of cutting line 29' on pattern piece 29.

The relative dimensions and positions of portions 101, 102, 103 and 104 are selected to provide normal cutting line signals as required while assuring that, once the sensing device is oriented with pivot 6 at the intersection of notch line 35 and cutting lines 102' and 104' and sensor 60 aligned with the field of marking element 100 which overlies pattern piece 29, such sensor will be aligned with the light-reflective area 101,103. For this reason, strip 102, generally corresponding to section 37 of the marking element shown in FIG. 3, has a breadth less than lead interval B between pivot 6 and sensor 60 so that sensor 60, as it hunts a cutting line from its position immediately following the notch-cutting program, will not detect any portion of strip 102. Section 104 which defines cutting line 104' following notch 35 overlays the background rather than the pattern piece 29 and sections 101 and 103 are of an extent that sensing device 60 will detect only light-reflective material, thereby effecting continuous rotation in the clockwise direction, until cutting line boundary 104' is located.

Because pattern piece 29 is to be traced in a counterclockwise direction, rather than the normal clockwise direction, special arragements must be made to effect proper cutting of the salient corners of this pattern piece. Otherwise, sensor 60 upon running past the apex of the salient corner would cause the cutting tool to turn in a clockwise direction until the sensor again sensed a cutting line. As can be seen from FIG. 2, such rotational direction would return the sensor to the same cutting line on which it approached the salient corner and would effect translation back along the same cutting line. According to prior procedure, an extension piece, such as the member 17, having a salient angle adjoining corner 18 of pattern piece 29 would be provided, the sides of the adjoining angles forming crossing continuous cutting lines. In order to eliminate such extension, which again results in fabric waste, markers 5, preferably in the form of adhesive marking labels 59, are shown as being located ahead of the lower left and upper right salient corners of pattern piece 29 to effect switching to the special program control so that the cutting tool would be turned in a counterclockwise direction to be correctly oriented for cutting these salient corners.

The cutting procedure for cutting pattern piece 29 in the pattern layout of FIG. 2 is described below, beginning at the approach to corner 105 of pattern piece 27, the cutting procedure for the other pattern pieces being the same as described above. Since corner 105 of pattern piece 27 adjoins a similar salient corner of pattern piece 29 at their respective apexes, the sides of such corners cooperate to form crossing continuous cutting lines, and the sensor will continue to receive a medium-intensity signal as it crosses the intersection at the adjoining corners. The sensor 60 travels as follows:

Starting on the cutting line forming the right side of pattern piece 27, crossing the intersection at corner 105 onto the left side of pattern piece 29. Along strip 52 of marking label 100, the guide signal for switching to program control device 71 is received by sensor 60; and the cutting tool is braked at the end of boundary 102', rotated in the counterclockwise direction, translated along notch line 35 and returned to the beginning of the notch line. Normal sensing control device 70 is then reactivated with pivot 6 located at the point at which boundary 102', notch line 35 and boundary 104' intersect, the sensor being in alignment with the white field formed by sections 101 and 103. Consequently, the sensor transmits the signal to effect rotation in the clockwise direction. Since the white field of section 103 is of greater length and breadth than lead interval B, the sensor signals control device 71 to continue clockwise rotation until the sensor registers with boundary 104', whereupon translational movement is resumed. Sensor 60 continues to trace cutting line 104' and 29'. Marking label 59 signals through sensor 60 of sensing device 61 to actuate switch 62 to activate program control device 71 to turn the cutting tool in the counterclockwise direction to turn the first salient corner. Thereafter, normal sensing control device 70 effects translation along the bottom of pattern piece 29 around the curve of extension 17 and up the right side of the pattern piece to marking label 59. Such marking label activates program control device 71 to effect counterclockwise rotation at the corner. Sensing control device 70 effects translation along the top of pattern piece 29 across the intersection at corner 105 and along the bottom of pattern piece 27, the remaining cutting procedure being the same as described earlier.

The particular shapes of sections 101, 102, 103 and 104 of marking label 100 are immaterial, so long as the boundaries 102' and 104' are provided, and the field formed by sections 101 and 103 is of an extent such that sensor 60 receives no signals characteristic of the pattern components from the termination of the special program for cutting notch 35 to arrival of the sensor at boundary 104'.

As the preceding description indicates, provision of marking elements 5 and 100 permit countless variations of pattern layouts, all of which permit reduction in the amount of waste fabric. The pattern layouts utilizing such markers will result in shorter endless cutting lines for the pattern layouts than have been possible with previous cutting procedures, so that cutting time can also be reduced.

We claim:

1. A method of controlling a cutting tool for effecting automatic cutting of garment components from flat material in apparatus including a pattern layout having a plurality of discrete pattern components, sensing means for sensing cutting lines of the pattern layout, and means operable by the sensing means for guiding the cutting tool to cut the material, comprising the steps of producing a guide signal at a predetermined location along a cutting line of the pattern layout, stopping the sensing means operated guiding means in response to such guide signal, braking the cutting tool to stop at the end of a predetermined distance beyond the cutting tool location at the time the guide signal was produced, rotating the cutting tool in a selectable direction through a selectable angle, traversing the cutting tool forwardly along a line of predetermined short length, and restarting the sensing means operated guiding means.

2. In the method defined in claim 1, producing the guide signal when the cutting tool is spaced ahead of the apex of a salient corner in the cutting line by a distance equal to the cutting tool braking distance.

3. In the method defined in claim 1, producing the guide signal when the cutting tool is spaced ahead of the point of intersection of a notch line with the cutting line by a distance equal to the cutting tool braking distance.

4. In the method defined in claim 1, producing the guide signal when the cutting tool is spaced ahead of a point on the cutting line of one pattern component from which the cutting tool is to be transferred to the cutting line of another pattern component by a distance equal to the cutting tool braking distance.

5. Apparatus for automatically cutting garment components from flat material having a pattern layout including a plurality of discrete pattern components, sensing means for tracing cutting lines of the pattern layout and producing signals corresponding thereto and a cutting tool, the improvement comprising marking means locatable along a cutting line and including a guide signal-producing portion, first cutting tool control means for controlling movement of the cutting tool in response to sensing means signals, second cutting tool control means for controlling movement of the cutting tool independently of the sensing means signals including braking the cutting tool to stop at the end of a predetermined distance, and switch means actuatable in response to said marking means guide signal to deactuate said first cutting tool control means and to actuate said second cutting tool control means and actuatable by said second cutting tool control means to actuate said first cutting tool control means.

6. The apparatus defined in claim 5, the pattern layout including a background of one color, the pattern components being of a contrasting color, and the sensing means being photoelectric, the improvement further comprising the marking means including an area on a pattern component adjacent to a segment of the pattern component cutting line of a color intermediate the constrasting background and pattern component colors.

7. The apparatus defined in claim 5, the pattern layout including a background of one color, the pattern components being of a contrasting color, and the sensing means being photoelectric, the improvement further comprising the marking means including an area on a pattern component of the same color as the background adjacent to a segment of the pattern component cutting line, and a strip alongside said marking means area and aligned with the cutting line segment and of the same color as the pattern components.

8. The apparatus defined in claim 7, a segment of the cutting line of each of two pattern components being arranged in the pattern layout in adjacent spaced relationship, a cutting line connecting a point on each of the adjacent cutting line segments, said connecting line including marking means, the cutting line aligning strip thereof being spaced from each of the adjacent cutting line segments an interval corresponding to the cutting tool braking distance, and first and second spacer surfaces each being of the color of the pattern components and having a boundary alignable along said connecting line of a length equal to the cutting tool braking distance, each of said spacers being interposed between the cutting line aligning strip and the adjacent cutting line segment of a pattern component.

9. The apparatus defined in claim 5, in which the cutting line intersects a notch line and the marking means signal-producing portion is spaced ahead of the notch line intersection an interval corresponding to the cutting tool braking distance.

10. The apparatus defined in claim 5, in which the cutting line includes a salient corner and the marking means signal-producing portion is spaced ahead of the apex of the salient corner an interval corresponding to the cutting tool braking distance.

11. The apparatus defined in claim 5, in which the cutting line of each of two pattern components includes a salient corner, the components being arranged in the pattern layout with the apexes of the salient corners abutting, and the marking means signal-producing portion is located on the cutting line of one of the pattern components ahead of the abutting salient corner apexes an interval corresponding to the cutting tool braking distance.

12. The apparatus defined in claim 5, in which the marking means is preformed independently of a particular set of pattern components and is insertible in a pattern layout for producing a guide signal at a selected location along the cutting line.

13. The apparatus defined in claim 12, the pattern layout including a background of one color, the pattern components being of a contrasting color, and the sensing means being photoelectric, the improvement comprising the preformed marking means being a label including a cutting line aligning strip, an area along one side of said strip and disposable to overlie a portion of a pattern component of a color different than the pattern component color, a section on the other side of said cutting line aligning strip having the same color as the background and disposable to overlie the pattern layout background, and a spacer abutting an end of said strip having a cutting line aligning boundary and being of the color of the pattern components, said spacer boundary having a length proportionate to the cutting tool braking distance.

14. The apparatus defined in claim 13, the sensing device having a cutting line tracing pivot and a sensor leading such pivot and spaced therefrom by a lead interval, the improvement further comprising the label spacer having a width perpendicular to the boundary less than the sensing means lead interval, the label further including a cutting line simulating portion abutting the end of the spacer opposite the cutting line aligning strip, having the same color as the pattern components, disposable to overlie the pattern layout background and forming a cutting line aligning boundary, and an area alongside the spacer and the cutting line simulating portion having the same color as the background, being disposable to overlie a pattern component, having a width perpendicular to the cutting line simulating boundary greater than the sensing means lead interval and a length on each side of the location at which the cutting line simulating portion and spacer abut greater than the sensing means lead interval.

15. In the method defined in claim 1, after traversing the cutting tool forwardly along the predetermined line, the step of moving the cutting tool back along such predetermined line before restarting the sensing means operated guiding means.

* * * * *